United States Patent [19]

Ojima

[11] Patent Number: 5,037,358
[45] Date of Patent: Aug. 6, 1991

[54] BELT OR CHAIN TENSIONER FOR POWER TRANSMITTING SYSTEM

[75] Inventor: Juji Ojima, Kanagawa, Japan

[73] Assignee: NHK Spring Co., Ltd., Yokohama, Japan

[21] Appl. No.: 519,754

[22] Filed: May 7, 1990

[30] Foreign Application Priority Data

May 10, 1989 [JP] Japan .................................. 1-116263

[51] Int. Cl.⁵ ............................................. F16H 7/08
[52] U.S. Cl. ..................................... 474/111; 474/130
[58] Field of Search ............... 474/101, 111, 138, 136

[56] References Cited

U.S. PATENT DOCUMENTS

| | | | |
|---|---|---|---|
| 4,702,726 | 10/1987 | Ojima et al. | 474/101 |
| 4,722,720 | 2/1988 | Ojima et al. | 474/101 |
| 4,743,224 | 5/1988 | Yoshikawa et al. | 474/101 |
| 4,902,266 | 2/1990 | Ojima et al. | 474/111 |
| 4,934,984 | 6/1990 | Ojima et al. | 474/111 |

FOREIGN PATENT DOCUMENTS 0159845 7/1987 Japan ................................. 474/111

*Primary Examiner*—Bruce M. Kisliuk
*Attorney, Agent, or Firm*—Fleit, Jacobson, Cohn, Price, Holman & Stern

[57] ABSTRACT

A belt or chain tensioner comprising a collar and a rotational cylinder with a flange type spring seat for preventing the axial play of the rotational cylinder and the penetration of the torsion spring into a ring groove provided between a bearing and the spring seat of the rotational cylinder.

2 Claims, 3 Drawing Sheets

BELT OR CHAIN TENSIONER FOR POWER TRANSMITTING SYSTEM

BACKGROUND OF THE INVENTION

The present invention relates to a tensioner for motorcycles and automobiles, more particularly to a tensioner for tensioning a drive chain or belt for driving a camshaft of an engine.

A conventional tensioner such as a belt tensioner or a chain tensioner is used to apply constant tension on a belt or chain even when it looses predetermined tension due to elongation or slackening caused by wear or friction. For this reason it is preferable that the tensioner may be kept advanced at all times in a tensioning direction and may have such a characteristic as a rigid object against a counterforce in an opposite direction. FIG. 3 shows a vertical section of a conventional tensioner.

The tensioner shown in FIG. 3 comprises a casing 1 with a housing 1a formed in an axial direction of the tensioner, a rotational cylinder 2 inserted rotatably in the housing, a tension rod 3 engaged with a threaded portion of the rotational cylinder 2, a torsion spring 4 inserted externally on the rotational cylinder 2. One end 4a of the tension spring 4 is inserted in a slit 2a formed on the rear end of the rotational cylinder 2 and the other end, a hook 4b is inserted in a long groove 1b formed in the front portion of the housing 1a for driving the rotational cylinder 2. A seal bolt 6 is screwed on the rear end of the casing 1. The top of the tension rod 3 is covered with a cap 8 fixed with a spring pin 7, whereby a chain or belt is tensioned directly or indirectly to keep constant tension. The tension rod 3 is externally round and diametrically has two plain surfaces. And it is inserted freely in a corresponding slot of same shape formed on a bearing 9 so as not to turn, whereby the rotating force of the rotational cylinder 2 can be converted in urging force.

This type of tensioner can be applied a predetermined torsional torque by using a flat driver through a threaded hole on the rear end of the casing after mounting the components in the housing and then the threaded hole can be hermetically closed with an "O" ring 5 and bolt 6. Thus the tensioner can be mounted, for example on the outer wall of equipment such as an engine body by inserting the front portion of the casing so that the cap of tension rod may keep constant tension on chain or belt by means of restoring force of the torsion spring.

It works satisfactorily when mounted. However, it is not easy to mount the components such as tension rod, rotational cylinder and torsion spring in the housing. Therefore a ring groove of small diameter is formed between the cylinder portion and threaded portion of the rotational cylinder so that a flat washer may be freely mounted so as to facilitate the mounting of a collar 11 between the bearing 9 and a flat washer 10. In this way the movement of the rotational cylinder 2, tension rod 3 and the torsion spring 4 in the axial direction can be restricted by the flat washer 10, collar 11, bearing 9 and a snap ring 12.

Hereinafter the problems to be solved by the present invention will be explained. In the conventional belt or chain tensioner, when the torsion spring 4 is wound to get torsional torque, the hook 4b penetrates into the gap between the flat washer and the rotational cylinder 2 sometimes impeding the normal function of the torsion spring 4 or impeding the normal rotation of the rotational cylinder 2. It is because the torsion spring 4 extends in the axial direction when wound and at the same time occurs eccentrical movement causing such problems aforementioned. Then it is effective to make the gap between the collar 11 and the flat washer 10 as small as possible, but it is very hard to reduce this gap ignoring the diameter of wire material.

SUMMARY OF THE INVENTION

The present invention has been developed taking the above situations in consideration so as to provide a belt or chain tensioner wherein a hook of a torsion spring does not become entangled.

Now means to solve the problem aforementioned will be explained.

The belt or chain tensioner according to the present invention is a tensioner having a rotational cylinder inserted in a torsion spring so as to rotate and to engage with a tension rod of which rotation is impeded by a bearing sliding in the slots of the casing, whereby the rotational force of the rotational cylinder can be converted to an urging force for the tension rod in an axial direction of the tensioner, characterized by comprising a rotational cylinder with a spring seat between the ring groove and the cylinder portion to support the torsion spring and a collar mounted between the spring seat and the bearing so as to impede the movement of the rotational cylinder in the axial direction of the tensioner.

EMBODIMENT

Figure 1:
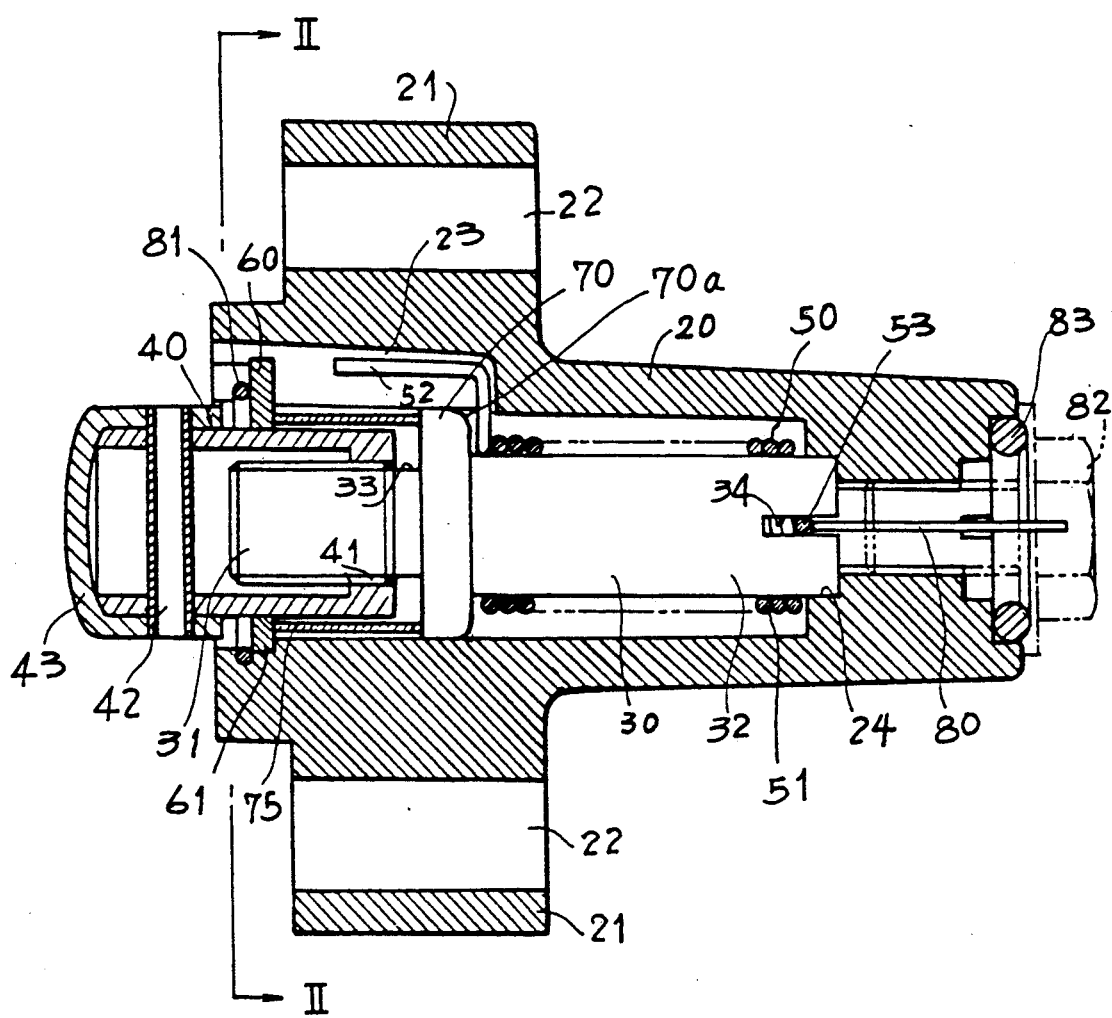
FIG. 1 illustrates a vertical section of an embodiment according to the present invention.
Figure 2:
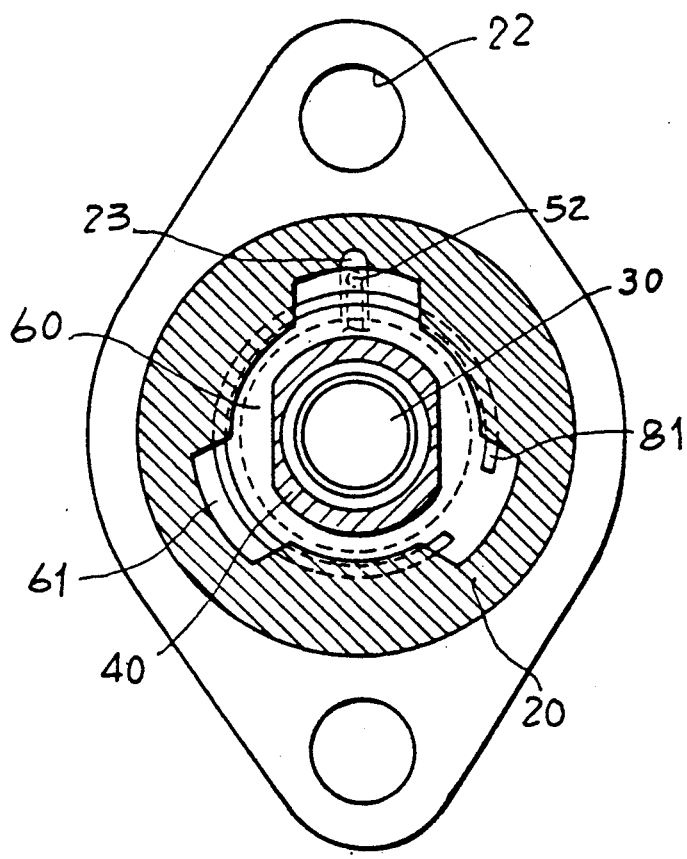
FIG. 2 shows a section taken along line II—II of the FIG. 1.
Figure 3:
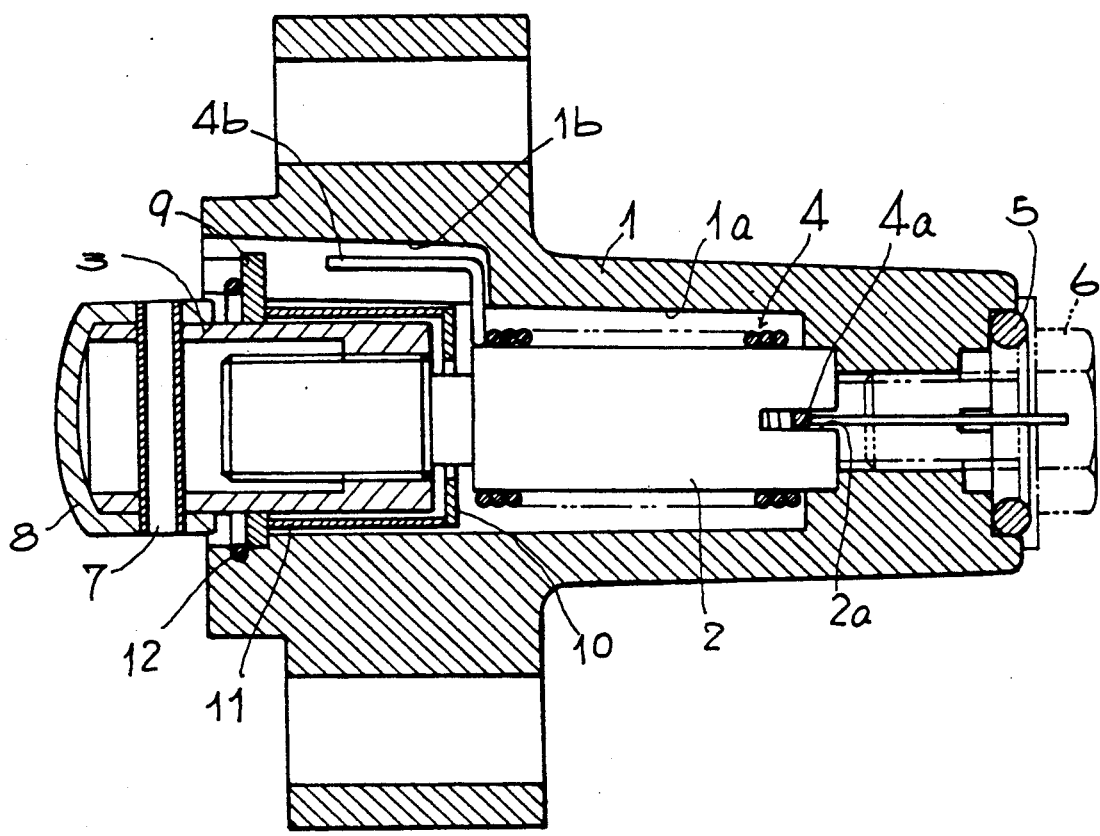
FIG. 3 shows a vertical section of the conventional tensioner.

Hereinafter an embodiment according to the present invention will be explained referring to FIGS. 1 and 2.

The tensioner comprises a casing 20 with a housing 20a, a rotational cylinder 30 screwed in a tension rod 40 both inserted in the casing 20, a torsion spring 50 for driving the rotational cylinder 30 and a bearing 60 mounted on the front end of the casing 20 for stopping the rotation of the tension rod 40, wherein the term "front" means the urging direction of the tension rod.

The casing 20 is provided with a flange portion 21 extending in the radial direction of the tensioner, wherein two holes are formed in diametrical positions for fixing with bolts on outer wall of equipment such as engine not illustrated.

The rotational cylinder 30 comprises a male threaded portion 31 on the front end and a cylinder portion 32 on the rear end, between which a ring groove 33 is formed. The rear end of cylinder portion 32 of the rotational cylinder 30 is supported by a bearing portion 23 formed in the casing 20. On the rear end of cylinder portion 32, a slit 34 is formed so as to fix the rear end of torsion spring 50 for winding. The male threaded portion of rotational cylinder 30 is engaged with female threaded portion of the tension rod 40. On the ring groove 33 between the male portion 31 and cylinder portion 32, a spring seat 70 to be explained layer is mounted.

On the rear end of tension rod 40, a female threaded portion 41 is provided so as to engage with the male threaded portion 31 of the rotational cylinder 30. The front end of tension rod 40 is of tubular form and protruding from the housing 20a of the casing 20. The rotation of the tension rod 40 is impeded by the bearing 60 and even when the tension rod 40 is driven by the rotational cylinder 30, the tension rod 40 is only urged in axial direction so as to give a constant tension on chain or belt, because of the urging force converted from rotational force by the bearing 60. In addition, the front end of the tension rod 40 is covered with a cap 43 fixed on the tension rod with a spring pin 42.

The cylinder portion 32 of the rotational cylinder 30 is inserted in the coil portion 51 of the torsion spring 50. The hook portion 52 of the torsion spring 50 is inserted in the long groove 23 formed on the inner wall of the housing 20a of the casing 20. The rear end 53 of the torsion spring 50 is inserted in the slit 34 formed on the rear end of the rotational cylinder 30. Having this type of construction, when torsional torque is given on the torsion spring by winding the rear end of rotational cylinder 30, the rotational cylinder can be driven by the torsion spring 50. The winding operation can be done by driving the slit rear end of the rotational cylinder with tool such as flat driver.

Said bearing 60 is mounted on the front end of the casing 20 and fixed with a snap ring 81. The bearing 60 is provided with three protrusions 61 with the angular distance of 120°, which are inserted in corresponding slots formed on the front end of the casing 20 so as not to turn. In other words the bearing 60 works to convert the rotational force given on the tension rod 40 in urging force. For this reason, the tension rod 40 is externally round and diametrically has two plain surfaces. And the mating slot 62 on the bearing 60 is of same shape so that the tension rod 40 may be inserted freely in the axial direction. In the FIG. 1, the numeral 82 indicates a seal bolt and the numeral 83 indicates an "O" ring mounted on the rear end for improving airtightness of the seal bolt.

A spring seat 70 is formed between the cylinder portion 32 and the ring groove 33 and a collar 75 is mounted between the spring seat 70 and said bearing 60. The spring seat 70 extends radially in flange form from the front end of cylinder portion 32 and has contact on the inner wall of the housing 20a so that the hook portion of the torsion spring may sit on the seat. In this case there is not any gap between the spring seat 70 and rotational cylinder 30. Now, when the torsion spring is wound by rotating the rotational cylinder 30 with a flat driver, the hook portion of the spring is not entangled even though the coil portion extends axially and eccentrically moves, as occurred in conventional tensioners. Accordingly the torsion spring 50 functions normally to rotate the rotational cylinder 30. In addition, the rear edge 70a of the spring seat 70 is rounded so that the hook 52 may not break easily due to wear or friction.

Said collar 75 is of tube form and coaxially mounted on the rotational cylinder 30 and tension rod 40 between the front end of spring seat 70 and the bearing 60 fit on the casing 20. Accordingly the movement of the rotational cylinder 30 in the axial direction can be stopped and the axial play of the rotational cylinder can be eliminated.

In conclusion, having this type of spring seat 70, collar 75 and bearing 60, the rotational cylinder 30 of the belt or chain tensioner according to the present invention is free from an unnecessary axial play and the winding operation and rotating operations of torsion spring can be done exactly, without entangling on the rotational cylinder 30. Further, since the spring seat 70 is incorporated with the rotational cylinder 30, the assembling work of the belt tensioner has been simplified largely.

What is claimed is:

1. A belt or chain tensioner particularly for use in a power transmitting system, said tensioner comprising:
   a casing having a front end and a rear end, said casing;
   a rotational cylinder within said casing, said rotational cylinder having a first end portion, a second end portion and a ring groove provided between said first end portion and said second end portion, said rotational cylinder having a longitudinal axis;
   a flange type spring seat formed integrally on said rotational cylinder between said ring groove and said second end portion of the rotational cylinder, said flange type spring seat having a front surface facing the front end of the casing and a rear surface facing the rear end of the casing;
   a torsion spring provided around the second end portion of the rotational cylinder to rotate said rotational cylinder;
   a tension rod within said casing and having one end projecting from the front end of said casing, the other end of said tension rod being engaged with the first end portion of said rotational cylinder, said tension rod having a longitudinal axis;
   a bearing mounted in said casing and extending around said tension rod, said bearing preventing rotation of said tension rod, whereby a rotational force of said rotational cylinder can be converted to an urging force for said tension rod in its axial direction; and
   a collar mounted coaxially around said tension rod and extending from said bearing to the front surface of said flange type spring seat, said collar preventing movement of said rotational cylinder in its axial direction.

2. A belt or chain tensioner according to claim 1, wherein an edge of said flange type spring seat extending along the rear surface thereof is rounded sufficiently to prevent damage to said torsion spring.

* * * * *